Oct. 25, 1955  J. FABRI ET AL  2,721,693
SUPERSONIC COMPRESSOR
Filed May 22, 1950
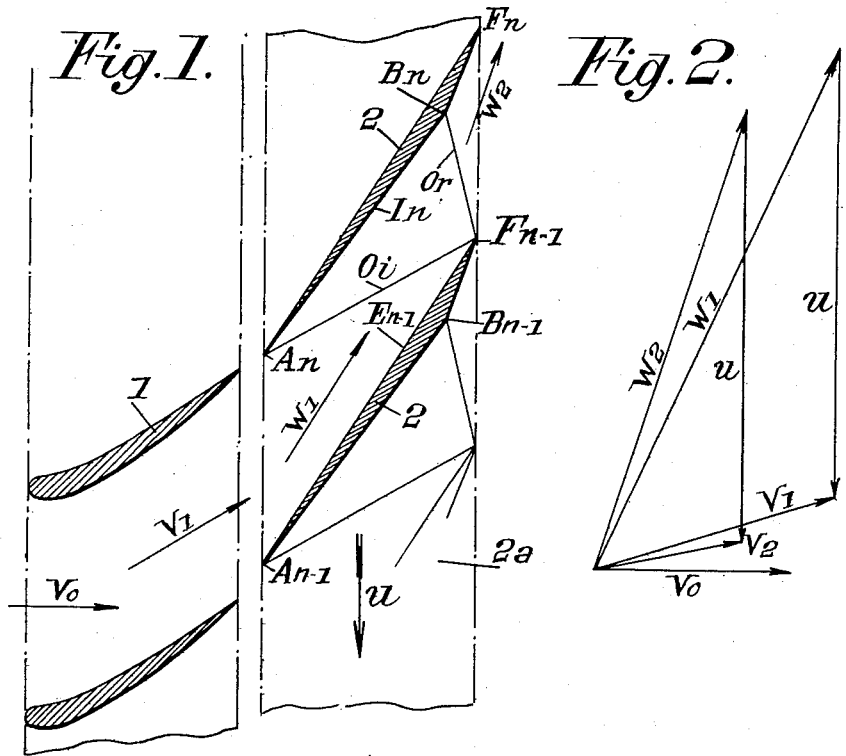
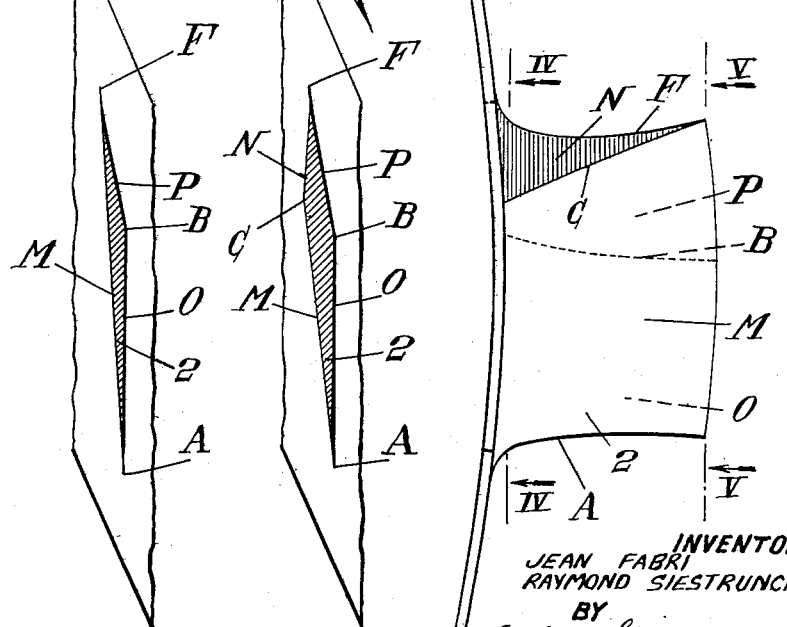
INVENTORS
JEAN FABRI
RAYMOND SIESTRUNCK
BY
Bailey, Stephens + Huettig
ATTORNEYS

United States Patent Office 2,721,693
Patented Oct. 25, 1955

2,721,693

SUPERSONIC COMPRESSOR

Jean Fabri and Raymond Siestrunck, Paris, France, assignors to "Office National d'Etudes et de Recherches Aéronautiques" (O. N. E. R. A.), Paris, France, a society of France Application May 22, 1950, Serial No. 163,424

Claims priority, application France May 24, 1949

2 Claims. (Cl. 230—120)

The present invention relates to shock wave compressors, this term being meant to include all compressors which are at least partly axial, run at high speed, and in the axial portion of which at least a portion of the compression is due to the formation of shock waves between the blades of at least one rotor the front edge of which is subjected to a supersonic relative flow. Our invention is more particularly concerned with aircraft continuous flow engines (turbo-jets, turbo-props, etc.).

Its chief object is to provide a device of this kind which is better adapted to meet the requirements of practice than those used up to this time.

According to our invention, in a compressor including at least one axial blade wheel the front edge of which is subjected to the action of a supersonic relative flow, the blades are given an incidence such that the oblique shock wave which is formed on the leading edge of each blade develops chiefly between the pressure side of said blade and the suction side of the preceding blade (considered with reference to the direction of rotation of the wheel), the flow passages between the respective blades being so shaped that this oblique shock wave ends substantially on the trailing edge of the suction side of the preceding blade.

Another feature of our invention consists in giving every blade of at least one axial wheel of the compressor a profile of triangular shape near its end and a profile of quadrangular shape near its root.

A preferred embodiment of our invention will be hereinafter described with reference to the accompanying drawings, given merely by way of example and in which:

Fig. 1 shows, in a developed form, a portion of the distributor and of the rotating wheel of a shock wave axial compressor made according to the invention;

Fig. 2 is the diagram of the velocity vectors relating to this compressor;

Fig. 3 is a side view of one blade of the compressor;

Figs. 4 and 5 are sections of said blade, respectively on the lines IV—IV and V—V of Fig. 3.

It will be supposed, by way of example, that it is desired to provide an aviation axial compressor of the shock wave type intended to constitute the first stage of an axial and centrifugal compressor group the rotating elements of which are mounted directly, i. e. without the interposition of a speed reducing gear, on the turbine shaft of the continuous flow engine.

The axial compressor includes, in the usual manner, a fixed distributing blading 1, which causes the velocity vector of the air stream to pass from the initial axial value $V_0$ to a value $V_1$ inclined and preferably higher than $V_0$.

We provide, on the downstream side of distributor 1 and coaxially therewith, an axial wheel $2_a$ carrying blades 2, which rotates in a direction such that the air stream lines issuing from said distributor at an absolute velocity equal to $V_1$ are acted upon in counter-current fashion by blades 2, the tangential velocity $U$ of wheel $2_a$ being itself determined in such manner that the relative velocity $W_1$ of the air stream lines is supersonic, whereby a shock wave is formed on the leading edge of every blade 2.

We have shown on Fig. 2, at $W_1UV_1$, the velocity triangle at the entry of axial wheel $2_a$ and at $W_2UV_2$ the velocity triangle at the outlet.

According to our invention, blades 2 are given a profile such that the oblique shock wave which is formed on the leading edge $A_n$ of any blade (which shock wave is diagrammatically shown on Fig. 1 by straight line $O_1$) develops chiefly between the pressure side $I_n$ of said blade and the suction side $E_{n-1}$ of the preceding blade (considered with reference to the direction of rotation of wheel $2_a$).

This arrangement makes it possible to provide a smaller interval between two consecutive blades than the known solution according to which the shock wave developed chiefly between the suction side of one blade and the pressure side of the next blade. Thus, as the range of the shock waves is shortened, it will be easier to control them.

For this purpose, advantageously, we choose in every section a blade profile such that the suction side thereof is substantially rectilinear and so directed that, in adaptation conditions, it is parallel to relative velocity $W_1$, at least in the vicinity of the leading edge of the blade.

Of course, in order to increase the total rise of pressure produced in a passage between two consecutive blades, it is of interest to make use of the reflected shock wave $O_r$ which then constitutes a second pressure rise transition surface.

For this purpose, we provide, in the rear portion of the pressure side of every blade, a ridge ($B_n$, $B_{n+1}$, etc.), and we determine the characteristic angles of the blade profile, and therefore also the position of this ridge, so that, for a blade of index $n$, the reflected shock wave $O_r$ ends on ridge $B_n$ and the relative velocity $W_2$ of the stream on the downstream side of said shock wave $O_r$ is parallel to the end portion $B_nF_n$ of pressure side $I_n$, this velocity being still supersonic.

The length of the blade profiles is preferably determined in such manner that the shock wave $O_1$ coming from pressure side $I_n$ strikes the suction side $E_{n-1}$ of the preceding blade in the vicinity of the trailing edge $F_{n-1}$ thereof.

Advantageously, blades 2 are limited by ruled surfaces, which are easier to manufacture and permit the practical construction of wheels forming with their blades a single unit.

We have shown by way of example, on Figs. 3 to 5, an embodiment of such a blade having a triangular profile near its end (Fig. 5) and a quadrangular profile near its root (Fig. 4), such a profile ensuring a strengthening of this portion of the blade subjected to high tearing stresses due to the speeds of revolution that are being used.

It will be seen that, according to this embodiment, the blade is limited by four ruled surfaces, identified on Figs. 3 to 5 respectively by letters M, N, O, P.

Two of the apexes of the triangle-shaped tip section of Fig. 5 are connected to two diagonally opposed apexes of the quadrilateral-shaped root section of Fig. 4 by the leading and trailing edges A and F respectively of the blade, the third apex of said triangle-shaped section being connected to one of the two other apexes of said quadrilateral-shaped section by the ridge B of the pressure side wall OP of the blade and the fourth apex of said quadrilateral-shaped section being connected to the apex of the triangle-shaped section that is located on the trailing edge F of said blade by a ridge C of the suction side wall MN of the blade. The side N of the quadrilateral-shaped root section extending from ridge C to trailing edge F is very small, so that ridge C is very close to said trailing edge.

Such a compressor has many advantages, both from the point of view of efficiency and from that of simplicity of construction and small overall dimensions for a given output.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A compressor including a casing structure, a multiplicity of vanes fixed to said casing structure in an annular row, said vanes being arranged to guide the medium to be compressed, fed thereto at a predetermined velocity, to give it as it leaves said vanes a velocity represented by a given vector, a compressor rotor journalled axially in said casing structure and defining therewith an annular flow duct in line with said annular row, a plurality of blades carried by said rotor and extending across said annular flow duct to form between them a plurality of passages, each blade comprising, on the pressure side thereof, two substantially flat faces forming together an obtuse dihedral angle the ridge of which is substantially radial with respect to said rotor and located nearer to the trailing edge of said blade than to the leading edge thereof, and on the suction side at least one substantially flat face extending from said leading edge and parallel to the vector which is the resultant of the above mentioned vector and of a vector equal in magnitude but opposed in direction to that representing the peripheral velocity of said rotor running at its working speed, the velocities represented by the two last mentioned vectors being such that the component velocity is supersonic, the wedge angle between the two faces of each rotor blade which start from the leading edge thereof being acute, the plane extending from the leading edge of the pressure side wall of each passage to the rear edge of said flat face of the suction side wall of the same passage being oblique to said flat face of the suction side wall and making an angle of substantially less than 90° with the fore surface of said pressure side wall in the direction of flow and the plane extending from said rear edge of said flat face of the suction side wall of each passage to the ridge of the pressure side wall of said passage being oblique to said last mentioned pressure side wall, the dimensions of the faces of said blades and the distance between two consecutive blades being chosen such that a shock wave created at the leading edge of the pressure side wall of each passage extends toward the suction side wall of the same passage in the vicinity of the rear edge of said flat face thereof and a shock wave created at said last mentioned edge ends in the vicinity of the ridge of the pressure side wall of the same passage.

2. A compressor including a casing structure, a multiplicity of vanes fixed to said casing structure in an annular row, said vanes being arranged to guide the medium to be compressed, fed thereto at a predetermined velocity, to give it as it leaves said vanes a velocity represented by a given vector, a compressor rotor journalled axially in said casing structure and defining therewith an annular flow duct in line with said annular row, a plurality of blades carried by said rotor and extending across said annular flow duct to form between them a plurality of passages, each blade comprising, on the pressure side thereof, two substantially flat faces forming together an obtuse dihedral angle the ridge of which is substantially radial with respect to said rotor and located nearer to the trailing edge of said blade than to the leading edge thereof, and on the suction side at least one substantially flat face extending from said leading edge and parallel to the vector which is the resultant of the above mentioned vector and of a vector equal in magnitude but opposed in direction to that representing the peripheral velocity of said rotor running at its working speed, the velocities represented by the two last mentioned vectors being such that the component velocity is supersonic, the wedge angle between the two faces of each rotor blade which start from the leading edge thereof being acute, the plane extending from the leading edge of the pressure side wall of each passage to the rear edge of said flat face of the suction side wall of the same passage being oblique to said flat face of the suction side wall and making an angle of substantially less than 90° with the fore surface of said pressure side wall in the direction of flow and the plane extending from said rear edge of said flat face of the suction side wall of each passage to the ridge of the pressure side wall of said passage being oblique to said last mentioned pressure side wall, the dimensions of the faces of said blades and the distance between two consecutive blades being chosen such that a shock wave created at the leading edge of the pressure side wall of each passage extends toward the suction side wall of the same passage in the vicinity of the rear edge of said flat face thereof and a shock wave created at said last mentioned edge ends in the vicinity of the ridge of the pressure side wall of the same passage, each blade being of quadrilateral-shaped section at its root and of triangle-shaped section at its tip, two of the apexes of said triangle-shaped section being connected to two diagonally opposed apexes of said quadrilateral-shaped section by the leading and trailing edges of said blade, the third apex of said triangle-shaped section being connected to one of the two other apexes of said quadrilateral-section by said ridge of the pressure side wall of the blade and the fourth apex of said quadrilateral-section being connected to the apex of the triangle-shaped cross section that is located on the trailing edge of said blade by a ridge of the suction side wall of the blade, on which ridge ends the shock wave starting from the leading edge of the next blade.

References Cited in the file of this patent

UNITED STATES PATENTS 2,435,236     Redding     Feb. 3, 1948